US012786876B2

(12) United States Patent
Kutz et al.

(10) Patent No.: US 12,786,876 B2
(45) Date of Patent: Nov. 3, 2026

(54) WAKE-UP SIGNAL CODING SCHEME

(71) Applicant: QUALCOMM Incorporated, San Diego, CA (US)

(72) Inventors: Gideon Shlomo Kutz, Ramat Hasharon (IL); Tal Oved, Modiin (IL); Oren Matsrafi, Yad Modechai (IL); Amit Bar-Or Tillinger, Tel-Aviv (IL); Elad Meir, Ramat Gan (IL)

(73) Assignee: QUALCOMM Incorproated, San Diego, CA (US)

( * ) Notice: Subject to any disclaimer, the term of this patent is extended or adjusted under 35 U.S.C. 154(b) by 564 days.

(21) Appl. No.: 17/933,792

(22) Filed: Sep. 20, 2022

(65) Prior Publication Data

US 2024/0098643 A1 Mar. 21, 2024

(51) Int. Cl.
*H04W 52/02* (2009.01)

(52) U.S. Cl.
CPC ................................ *H04W 52/0235* (2013.01)

(58) Field of Classification Search
CPC ................................................. H04W 52/0235
See application file for complete search history.

(56) References Cited

U.S. PATENT DOCUMENTS

| | | | | |
|---|---|---|---|---|
| 7,296,212 | B1 * | 11/2007 | Hammons, Jr. | H03M 13/2963 714/701 |
| 2008/0034272 | A1 * | 2/2008 | Wu | G11C 29/52 714/763 |
| 2018/0219561 | A1 * | 8/2018 | Litsyn | H03M 13/2915 |
| 2018/0279274 | A1 * | 9/2018 | Sun | H04L 1/1887 |
| 2018/0359706 | A1 * | 12/2018 | Ding | H04B 17/318 |
| 2019/0090193 | A1 * | 3/2019 | Liu | H04W 52/028 |
| 2019/0349856 | A1 * | 11/2019 | Liu | H04W 52/0219 |
| 2020/0314755 | A1 * | 10/2020 | Sarkis | H04W 52/0219 |
| 2021/0045056 | A1 * | 2/2021 | Nam | H04W 52/0216 |
| 2021/0153120 | A1 * | 5/2021 | Atungsiri | H04L 27/2655 |
| 2021/0329550 | A1 * | 10/2021 | Åström | H04W 52/0216 |
| 2023/0189139 | A1 * | 6/2023 | Priyanto | H04W 52/0235 370/311 |
| 2024/0214042 | A1 * | 6/2024 | Zhu | H03M 13/3761 |
| 2025/0126559 | A1 * | 4/2025 | Zuo | H04W 52/0229 |

* cited by examiner

*Primary Examiner* — Pao Sinkantarakorn
*Assistant Examiner* — Paul A. Langer
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration of a sleep mode, the configuration indicating a coding scheme used for a wake-up signal (WUS). The UE may receive a WUS message, the WUS message being encoded with product coding, wherein a coding stage of the product coding comprises locally-decodable coding. The UE may receive a communication based at least in part on the WUS message. Numerous other aspects are described.

30 Claims, 10 Drawing Sheets

WAKE-UP SIGNAL CODING SCHEME

FIELD OF THE DISCLOSURE

Aspects of the present disclosure generally relate to wireless communication and to techniques and apparatuses for a wake-up signal coding scheme.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration of a sleep mode, the configuration indicating a coding scheme used for a wake-up signal (WUS). The method may include receiving a WUS message, the WUS message being encoded with product coding, wherein a coding stage of the product coding comprises locally-decodable coding. The method may include receiving a communication based at least in part on the WUS message.

Some aspects described herein relate to a method of wireless communication performed by a network node. The method may include transmitting a configuration of a sleep mode, the configuration indicating a coding scheme used for a WUS. The method may include transmitting a WUS message to UEs, the WUS message being encoded with product coding, wherein a coding stage of the product coding comprises locally-decodable coding. The method may include transmitting a communication based at least in part on the WUS message.

Some aspects described herein relate to a UE for wireless communication. The user equipment may include a memory and one or more processors coupled to the memory. The one or more processors may be configured to receive a configuration of a sleep mode, the configuration indicating a coding scheme used for a WUS. The one or more processors may be configured to receive a WUS message, the WUS message being encoded with product coding, wherein a coding stage of the product coding comprises locally-decodable coding. The one or more processors may be configured to receive a communication based at least in part on the WUS message.

Some aspects described herein relate to a network node for wireless communication. The network node may include a memory and one or more processors coupled to the memory. The one or more processors may be configured to transmit a configuration of a sleep mode, the configuration indicating a coding scheme used for a WUS. The one or more processors may be configured to transmit a WUS message to UEs, the WUS message being encoded with product coding, wherein a coding stage of the product coding comprises locally-decodable coding. The one or more processors may be configured to transmit a communication based at least in part on the WUS message.

Some aspects described herein relate to a non-transitory computer-readable medium that stores a set of instructions for wireless communication by a UE. The set of instructions, when executed by one or more processors of the UE, may cause the UE to receive a configuration of a sleep mode, the configuration indicating a coding scheme used for a WUS. The set of instructions, when executed by one or more processors of the UE, may cause the UE to receive a WUS message, the WUS message being encoded with product coding, wherein a coding stage of the product coding comprises locally-decodable coding. The set of instructions, when executed by one or more processors of the UE, may cause the UE to receive a communication based at least in part on the WUS message.

Some aspects described herein relate to a non-transitory computer-readable medium that stores a set of instructions for wireless communication by a network node. The set of instructions, when executed by one or more processors of the network node, may cause the network node to transmit a configuration of a sleep mode, the configuration indicating a coding scheme used for a WUS. The set of instructions, when executed by one or more processors of the network node, may cause the network node to transmit a WUS message to UEs, the WUS message being encoded with product coding, wherein a coding stage of the product coding comprises locally-decodable coding. The set of instructions, when executed by one or more processors of the network node, may cause the network node to transmit a communication based at least in part on the WUS message.

Some aspects described herein relate to an apparatus for wireless communication. The apparatus may include means for receiving a configuration of a sleep mode, the configuration indicating a coding scheme used for a WUS. The apparatus may include means for receiving a WUS message, the WUS message being encoded with product coding, wherein a coding stage of the product coding comprises locally-decodable coding. The apparatus may include means for receiving a communication based at least in part on the WUS message.

Some aspects described herein relate to an apparatus for wireless communication. The apparatus may include means for transmitting a configuration of a sleep mode, the configuration indicating a coding scheme used for a WUS. The apparatus may include means for transmitting a WUS message to UEs, the WUS message being encoded with product coding, wherein a coding stage of the product coding comprises locally-decodable coding. The apparatus may include means for transmitting a communication based at least in part on the WUS message.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
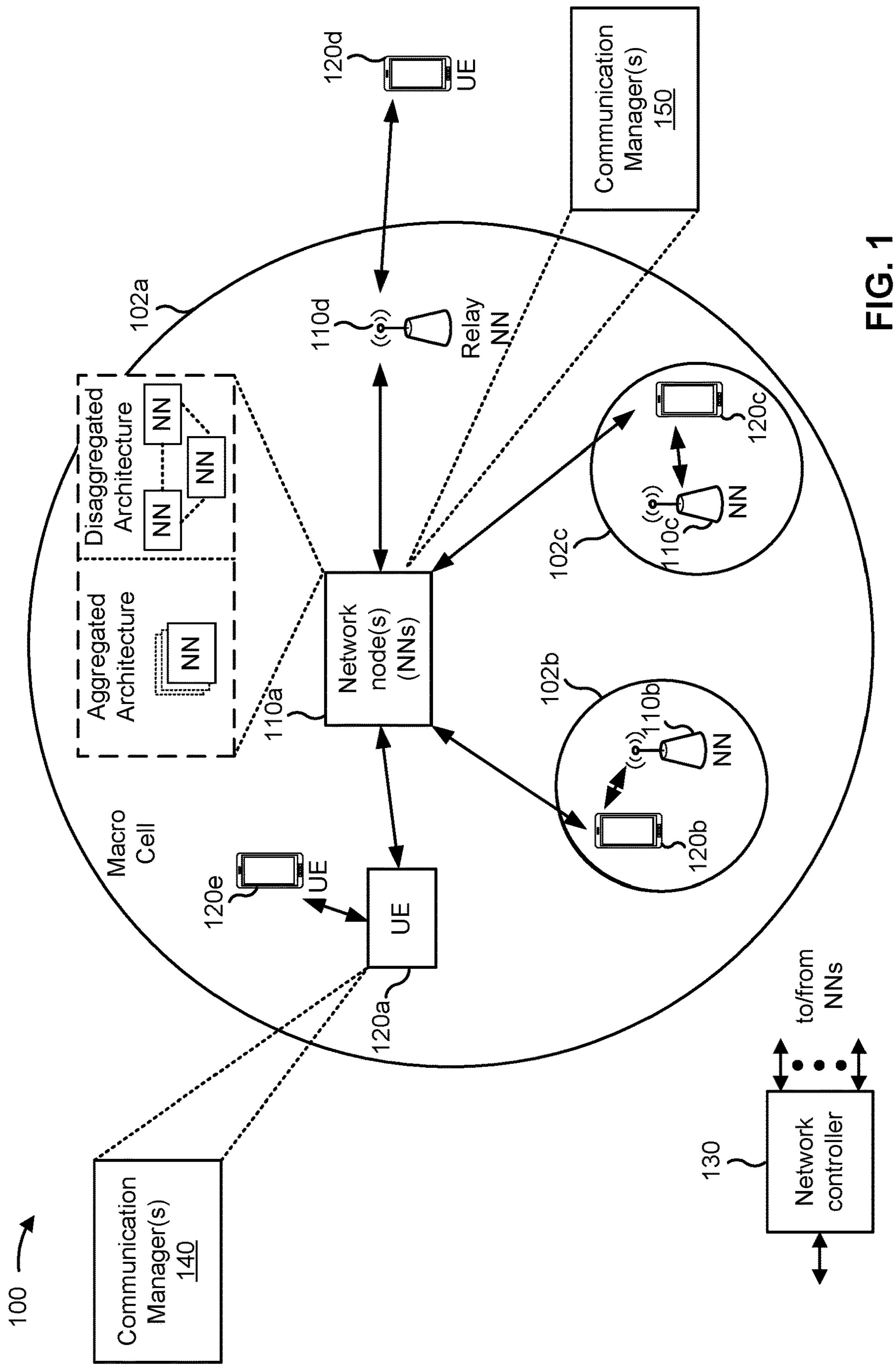
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration of a sleep mode, the configuration indicating a coding scheme used for a wake-up signal (WUS); receive a WUS message, the WUS message being encoded with product coding, wherein a coding stage of the product coding comprises locally-decodable coding; and receive a communication based at least in part on the WUS message. Additionally, or alternatively, the communication manager 140 may perform one or more other operations described herein.

In some aspects, the network node 110 may include a communication manager 150. As described in more detail elsewhere herein, the communication manager 150 may transmit a configuration of a sleep mode, the configuration indicating a coding scheme used for a WUS; transmit a WUS message to UEs, the WUS message being encoded with product coding, wherein a coding stage of the product coding comprises locally-decodable coding; and transmit a communication based at least in part on the WUS message. Additionally, or alternatively, the communication manager 150 may perform one or more other operations described herein.

As indicated above, FIG. 1 is provided as an example. Other examples may differ from what is described with regard to FIG. 1.

Figure 2:
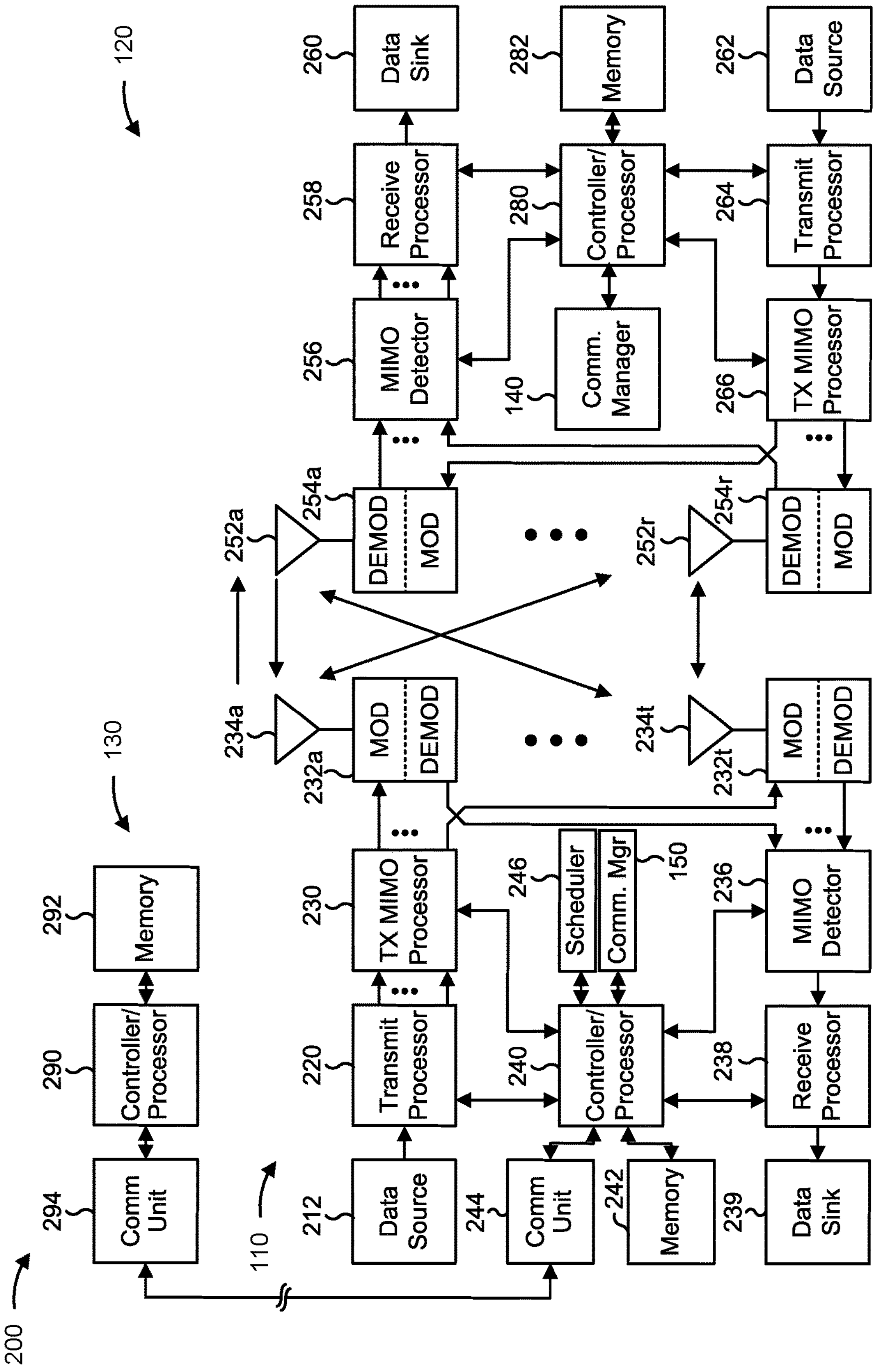
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with a WUS coding scheme, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving a configuration of a sleep mode, the configuration indicating a coding scheme used for a WUS; means for receiving a WUS message, the WUS message being encoded with product coding, wherein a coding stage of the product coding comprises locally-decodable coding; and/or means for receiving a communication based at least in part on the WUS message. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting a configuration of a sleep mode, the configuration indicating a coding scheme used for a WUS; means for transmitting a WUS message to UEs, the WUS message being encoded with product coding, wherein a coding stage of the product coding comprises locally-decodable coding; and/or means for transmitting a communication based at least in part on the WUS message. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
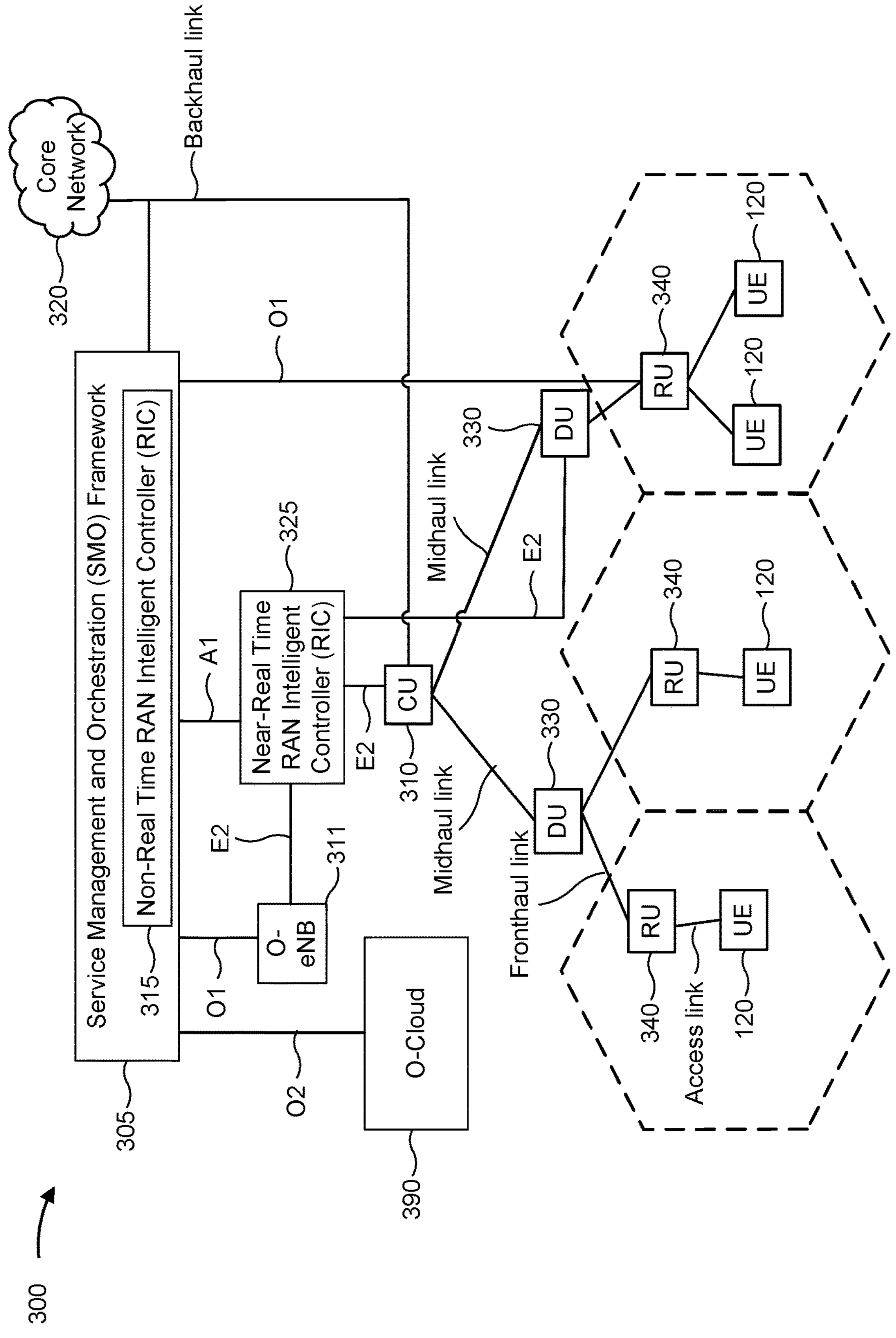
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
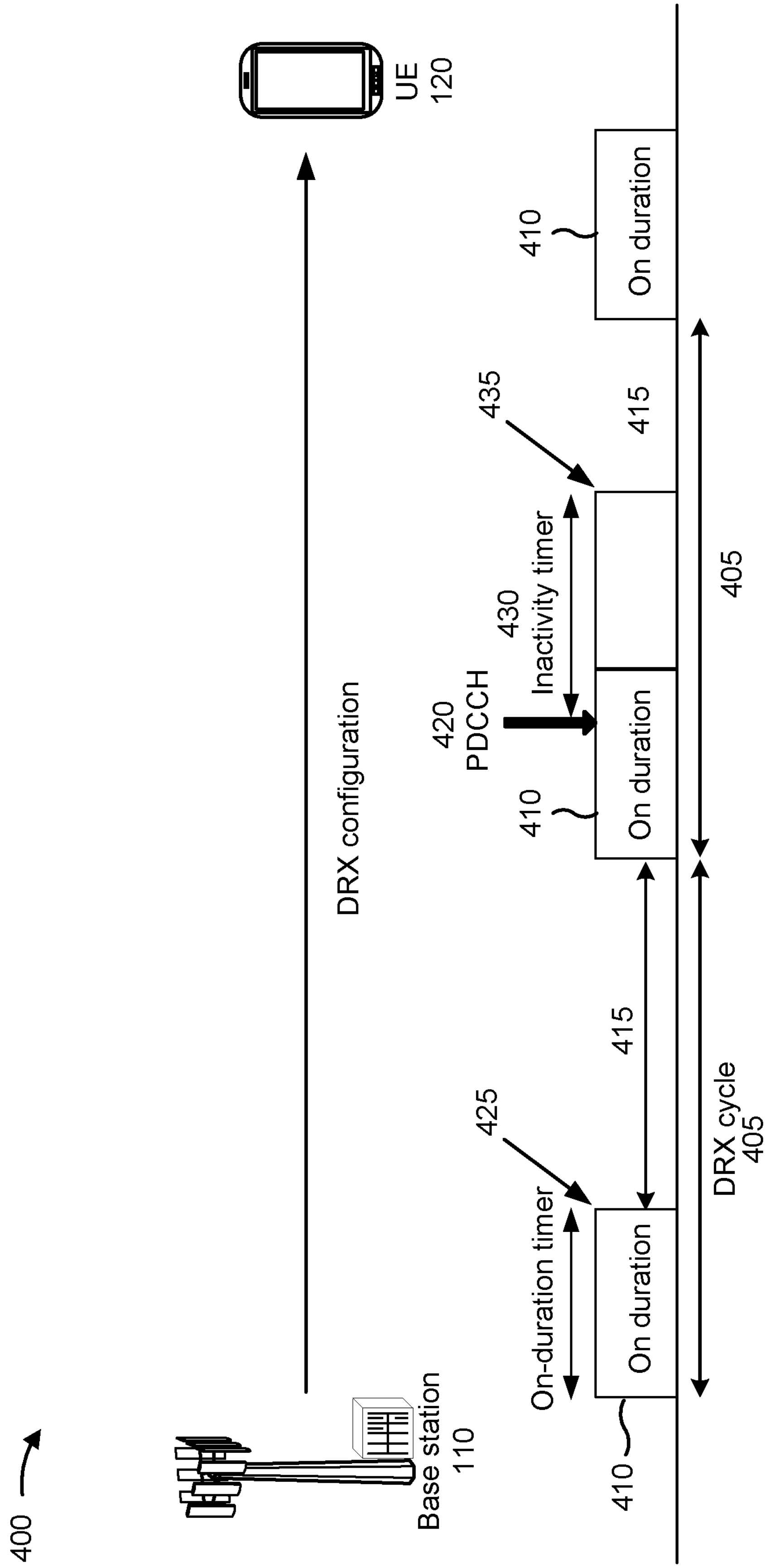
FIG. 4 is a diagram illustrating an example of a discontinuous reception (DRX) configuration, in accordance with the present disclosure.

FIG. 4 is a diagram illustrating an example 400 of a discontinuous reception (DRX) configuration, in accordance with the present disclosure.

As shown in FIG. 4, a network node 110 may transmit a DRX configuration to a UE 120 to configure a DRX cycle 405 for the UE 120. A DRX cycle 405 may include a DRX on duration 410 (e.g., during which a UE 120 is awake or in an active state) and an opportunity to enter a DRX sleep state 415. As used herein, the time during which the UE 120 is configured to be in an active state during the DRX on duration 410 may be referred to as an active time, and the time during which the UE 120 is configured to be in the DRX sleep state 415 may be referred to as an inactive time. As described below, the UE 120 may monitor a physical downlink control channel (PDCCH) during the active time, and may refrain from monitoring the PDCCH during the inactive time.

During the DRX on duration 410 (e.g., the active time), the UE 120 may monitor a downlink control channel (e.g., a PDCCH), as shown by reference number 420. For example, the UE 120 may monitor the PDCCH for downlink control information (DCI) pertaining to the UE 120. If the UE 120 does not detect and/or successfully decode any PDCCH communications intended for the UE 120 during the DRX on duration 410, then the UE 120 may enter the sleep state 415 (e.g., for the inactive time) at the end of the DRX on duration 410, as shown by reference number 425. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 430 (e.g., which may extend the active time). The UE 120 may start the DRX inactivity timer 430 at a time at which the PDCCH communication is received (e.g., in a transmission time interval (TTI) in which the PDCCH communication is received, such as a slot or a subframe). The UE 120 may remain in the active state until the DRX inactivity timer 430 expires, at which time the UE 120 may enter the sleep state 415 (e.g., for the inactive time), as shown by reference number 435. During the duration of the DRX inactivity timer 430, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 430 after each detection of a PDCCH communication for the UE 120 for an initial transmission (e.g., but not for a retransmission). By operating in this manner, the UE 120 may conserve battery power and reduce power consumption by entering the sleep state 415.

As indicated above, FIG. 4 is provided as an example. Other examples may differ from what is described with respect to FIG. 4.

Figure 5:
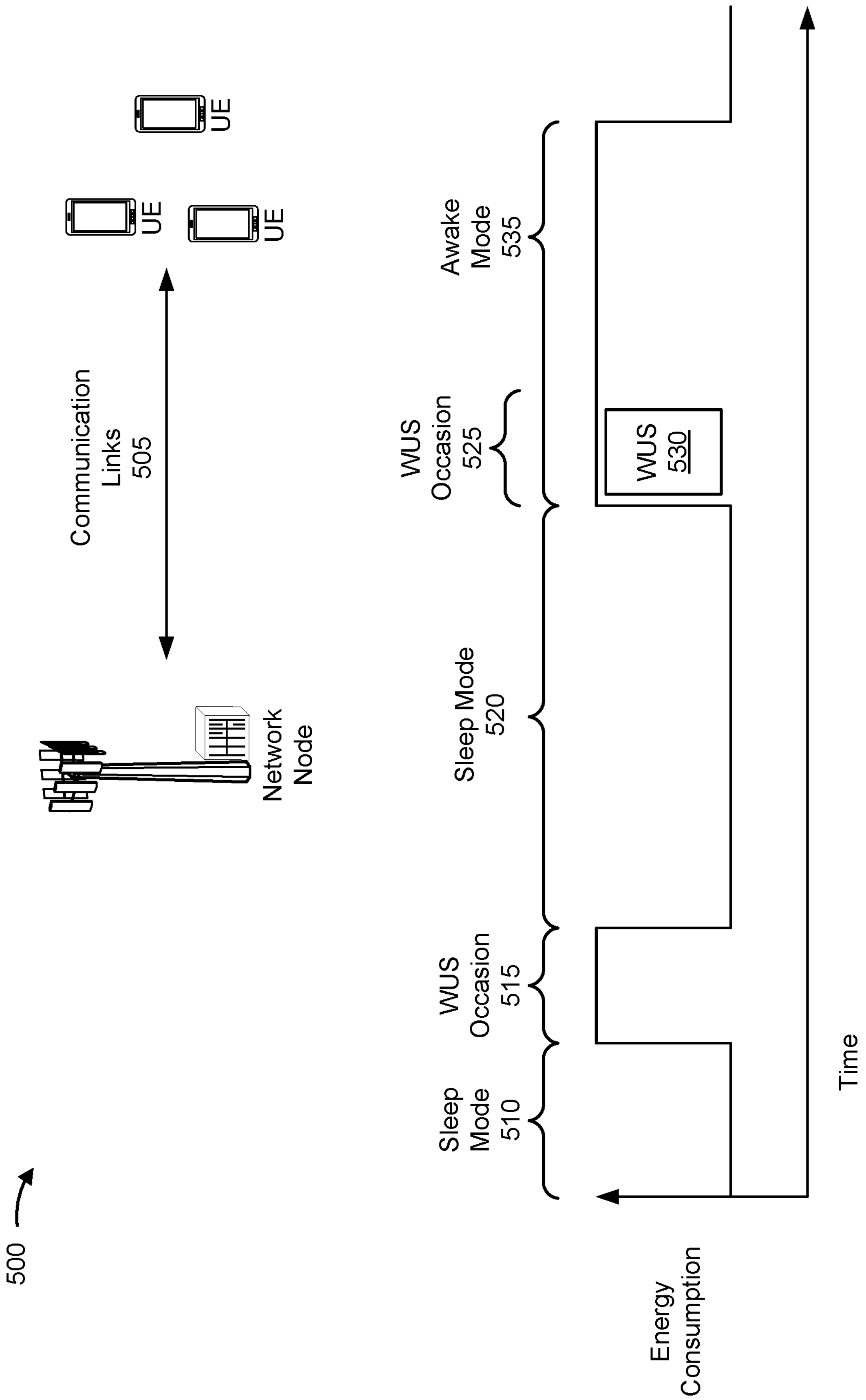
FIG. 5 is a diagram illustrating an example of a network energy saving mode, in accordance with the present disclosure.

FIG. 5 is a diagram illustrating an example 500 of a network energy saving mode, in accordance with the present disclosure. As shown in FIG. 5, a network node may communicate with multiple UEs via a wireless network. In some examples, the network node may support a cell of a wireless network to which the UEs are connected for wireless communication. As shown in FIG. 5, the network node may establish communication links 505 with the multiple UEs.

The network node cause one or more UEs of the multiple UEs to enter an energy saving mode (e.g., a power saving mode, a needs-based communication mode, and/or a discontinuous reception (DRX) mode, among other examples). The energy saving mode may be selected from a set of available energy saving modes that are configured to conserve power at the one or more UEs. Different energy saving modes may be associated with different power consumption and/or different transition times (e.g., an amount of time to switch between a sleep mode and an awake mode). In some networks, the network node may cause the one or more UEs to enter a sleep mode based at least in part on traffic conditions. For example, the network node may cause the one or more UEs to enter the sleep mode based at least in part on an amount of traffic and/or a periodicity of traffic satisfying a threshold.

As shown in FIG. 5, the network node may cause the one or more UEs to conserve energy by entering a sleep mode 510 when not receiving traffic. However, to maintain awareness of whether the one or more UEs need to enter a connected state or perform a small data transfer (SDT), the network node may configure WUS occasions to indicate to the one or more UEs to wake up for a communication. During the WUS occasions, the one or more UEs awaken to monitor for WUSs from the network node.

As shown in FIG. 5, the a UE does not receive a WUS during a WUS occasion 515. Based at least in part on not receiving a WUS during the WUS occasion 515, the UE returns to sleep mode 520 until a subsequent WUS occasion 525. During the WUS occasion 525, the UE receives a WUS 530 and remains in an awake mode 535 until completing communications with the network node.

The WUS 530 of FIG. 5 may include UE identifiers of each UE that is indicated to wake up. For example, in a network with 1024 UEs having 1024 unique UE identifiers, the network node may use the WUS 530 to wake up 32 of the UEs. Based at least in part on having 1024 UEs, each UE identifier may have a bitlength of at least 10 bits (e.g., enough bits to have 1024 unique values), so the WUS 530 may need to allocate 320 bits of wake-up indications. This may consume an unnecessary amount of network resources. Additionally, if each of the 1024 UEs wake up to read the WUS 530, computing and power resources will be unnecessarily consumed.

As indicated above, FIG. 5 is provided as an example. Other examples may differ from what is described with regard to FIG. 5.

Example 500 describes discontinuous monitoring for a WUS signal. In some networks, a UE may continuously monitor the WUS without any sleep cycle. In standard DRX modes (e.g., example 400), there is a tradeoff between saving energy (e.g., with long DRX cycles) and incurred latency due to the long DRX cycles. When using WUSs, this tradeoff may be balanced. On one hand, we can continuously monitor for the WUS signal and allow low latency and on the other hand the UE may reduce power consumption based at least in part on using, for the WUS signal and/or WUS monitoring, a low-power waveform and receiver.

In some aspects described herein, a network node may use a product code to encode a WUS to reduce a payload size. For example, the WUS may be encoded in a first dimension (e.g., a rows dimension) using first coding and encoded in a second dimension (e.g., a columns dimension) using a second coding.

The first coding may include maximum distance separable (MDS) coding to encode each UE identifier (e.g., UE identity) separately in a manner that provides maximal separation between the different identities. Since, for low complexity wake-up receivers (WURs), an on-off keying scheme (e.g., to wake up or not) may be used (or another, non-coherent scheme), MDS may result in maximal hamming distance, which may reduce errors in decoding the WUS.

The second coding may include locally decodable code (LDC). LDC may include coding that supports efficient decoding of any one bit of a coded payload without requiring to decode the whole message. For example, the LDC may include Hadamard coding or Reed Muller coding.

In some aspects, the first coding and/or the second coding may be used for error correcting codes. For example, based at least in part on the MDS providing maximal hamming distance, the MDS may decrease errors that may otherwise be caused when correlating a value (e.g., a row) of the WUS with a value of a UE identifier.

In some aspects, only the first coding may be applied in a simpler coding scheme. For example, the network node may encode each of M messages (each corresponding to one UE) separately. To determine whether a particular UE is indicated to wake up, the UE may correlate each message with a pre-stored (e.g., encoded) identity. The result is compared to a threshold which decides whether the WUS indicated for the UE to wake up. This simpler coding scheme may conserve power and computing resources, but is less spectrally-efficient because of usage of multiple small block sizes. Additionally, or alternatively, the simpler coding scheme may result in increased false alarm and/or miss detections.

Usage of a product code that includes two linear codes (n_1, k_1, d_1) and (n_2, k_2, d_2) results in a product encoding of (n_1 n_2, k_1 k_2, d_1 d_2). That is, the minimum distance is d_1 d_2. This results in a large, spectrally efficient code.

A UE that receives the WUS may decode the WUS using one or more operations. For example, the UE may use an LDC decoder (e.g., per column) to decode only one or more specific rows and not the entire WUS message. This may support simpler decoding, which may conserve power and processing resources of the UE.

To determine which rows a UE is to decode with the LDC decoder, connected and/or sleeping UEs may be segmented into groups. Each group can be assigned a set of rows in the WUS message. Assuming a uniform probability to wake up any one of the UEs, a selected combination of UEs to be woken up is likely to be supported by this scheme.

Once the UE has processed all columns of the set of the one or more specific rows, the decoder may correlate the resulting one or more specific rows with an identity of the UE (e.g., a pre-stored coded identity). The UE may compare the result to a threshold to determine whether the UE is indicated to wake up or not.

In some aspects, the UE identifier may be assigned by the network node (e.g., in an RRC message and/or a medium access control (MAC) control element (CE)). Alternatively, the UE identify may be derived (e.g., from least significant bits (LSBs) of a radio network temporary identifier (RNTI)).

In some aspects, the network node may transmit UE grouping assignments and/or mapping of groups to rows of the WUS message. In some aspects, the network node may transmit this information within an RRC message and/or a MAC CE. In some aspects, a number of rows is associated with a number of correlations that the UE needs to perform per message to determine whether the UE is indicated to wake up. In some aspects, the number of rows mapped to a group may be based at least in part on UE capabilities of UEs assigned to the group. In some aspects, the group assignments may be based at least in part on grouping UEs with similar UE capabilities such that the UEs within a particular group have similar UE capabilities to decode a similar number of rows of the WUS message. In some aspects, different groups may be mapped to different numbers of rows.

Selection of MDS code parameters and LDC code parameters may be a function of signal-to-noise ratios (SNRs) of UEs connected to the network node. In some aspects, the network node may group the UE based at least in part on expected SNRs. The network node may then provide an indication of the code parameters to each group. For example, 1024 UEs may be partitioned into 4 groups (e.g., groups of about 256 UEs or groups of different sizes). The UEs in different groups may decode the WUS separately (e.g., based at least in part on using different coding parameters in different groups).

In some aspects, a number of rows in the WUS message may indicate a number of UE groups and/or a number of simultaneous UEs to wake up. In some aspects, the number of rows may be assigned dynamically by the network node. For example, the network node may modify the number of rows for a UE group based at least in part on a change of UEs in the UE group, a change of a capability of the UEs in the UE group, traffic conditions (e.g., channel conditions), and/or traffic volumes, among other examples.

Based at least in part on encoding the WUS using a product code, the WUS may conserve computing, power, communication, and network resources while supporting a power saving mode (e.g., DRX mode). Additionally, or alternatively, based at least in part on UEs being grouped and being configured to decode only a proper subset of rows of the WUS, the UEs may conserve power and computing resources.

Figure 6:
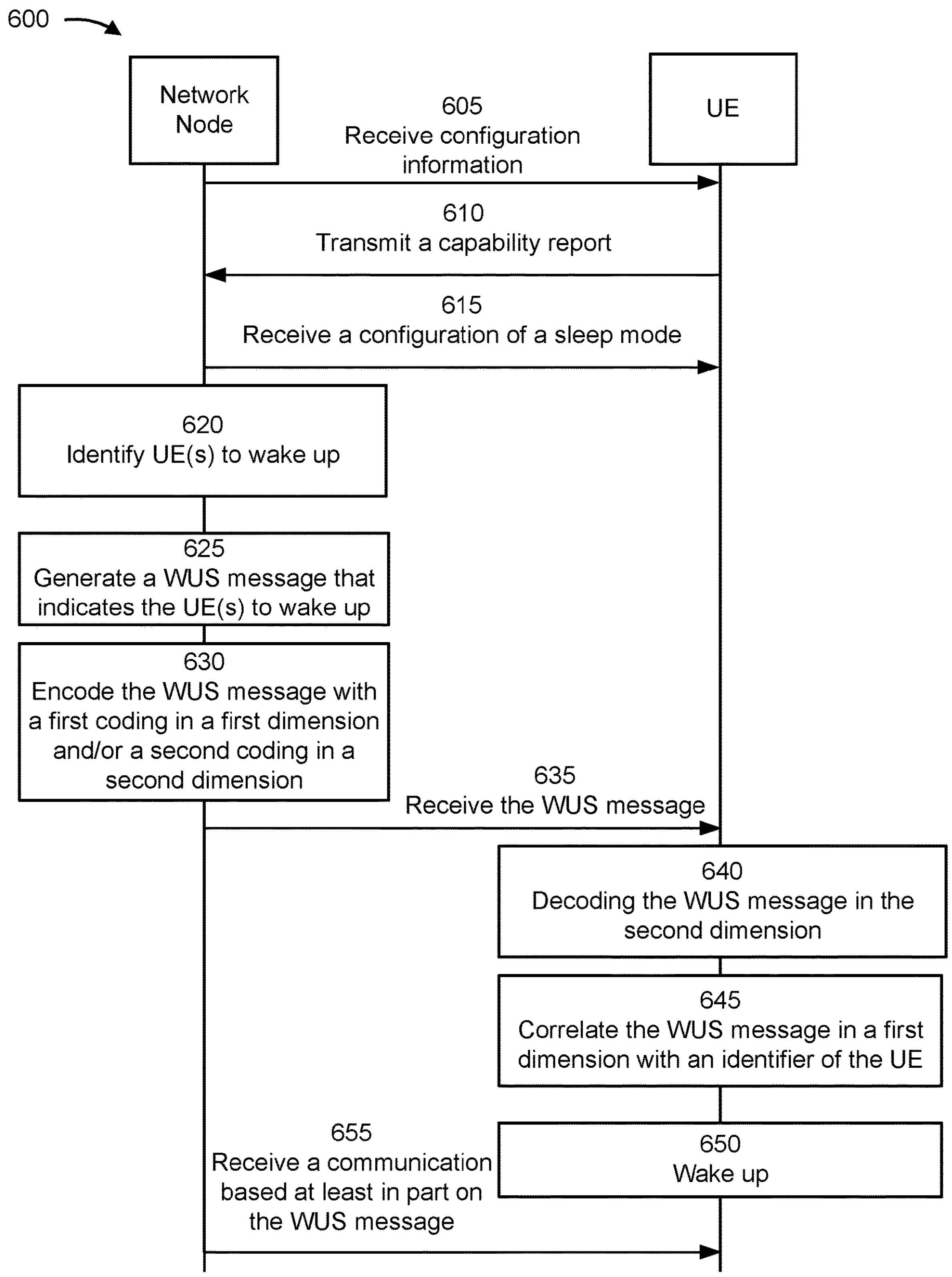
FIG. 6 is a diagram of an example associated with a wake-up signal coding scheme, in accordance with the present disclosure.

FIG. 6 is a diagram of an example 600 associated with a WUS coding scheme, in accordance with the present disclosure. As shown in FIG. 6, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6.

As shown by reference number 605, the network node may transmit, and the UE may receive, configuration information. In some aspects, the UE may receive the configuration information via one or more of RRC signaling, one or more MAC-CEs, and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit an indication of a capability report. For example, the configuration information may indicate that the UE is to report a capability for receiving a WUS message that is encoded with a product coding. In some aspects, the configuration information may indicate that the UE is to indicate one or more coding types that the UE supports (e.g., for the product coding). For example, the UE may indicate support for different LDC types or MDS types. In some aspects, the configuration information may indicate that the UE is to report an amount of resources available to decode a WUS message and/or an indication associated with a number of rows of a WUS message that the UE is capable of decoding (e.g., within a threshold amount of time).

The UE may configure itself based at least in part on the configuration information. In some aspects, the UE may be configured to perform one or more operations described herein based at least in part on the configuration information.

As shown by reference number 610, the UE may transmit, and the network node may receive, the capabilities report. In some aspects, the capabilities report may indicate UE support for one or more coding types that the UE supports (e.g., for the product coding). For example, the UE may indicate support for different LDC types or MDS types. In some aspects, the capability report may indicate an amount of resources available to decode a WUS message and/or an indication associated with a number of rows of a WUS message that the UE is capable of decoding (e.g., within a threshold amount of time).

As shown by reference number 615, the UE may receive, and the network node may transmit a configuration of a sleep mode. For example, network node may transmit the configuration of the sleep mode with an indication to enter a sleep mode. In some aspects, the configuration of the sleep mode may indicate one or more parameters for receiving a WUS message while in the sleep mode. For example, the configuration of the sleep mode may indicate a coding scheme used for a WUS message.

In some aspects, the configuration of the sleep mode may indicate a group to which the UE is assigned for receiving a WUS message. The group may be mapped to a proper subset of values (e.g., rows) of the WUS message that the UE is to decode to monitor for a wake-up indication (e.g., an encoded UE identifier). In some aspects, the configuration may indicate one or more parameters of a coding that is applied to the WUS. For example, the configuration may indicate parameters of a first coding (e.g., MDS coding) and/or parameters of a second coding (e.g., LDC). The UE may use the parameters to decode the WUS when received in a subsequent WUS occasion.

As shown by reference number 620, the network node may identify one or more UEs to wake up (e.g., from a sleep mode). In some aspects, the network node may identify the one or more UEs to wake up based at least in part on receiving data for transmission to the one or more UEs (e.g., received from the network or from an application server, among other examples).

As shown by reference number 625, the network node may generate a WUS message that indicates the one or more UEs to wake up. For example, the network node may include UE identifiers of the UEs identified to wake up.

As shown by reference number 630, the network node may encode the WUS message with a first coding in a first dimension and/or a second coding in a second dimension. For example, the network node may encode the WUS message with the first coding to rows of the WUS message and/or may encode the WUS message with the second coding to columns of the WUS message (e.g., after applying the first coding).

In some aspects, the first coding may include an MDS coding and/or the second coding may include an LDC. In some aspects, the network node may apply the MDS coding to code the WUS message (e.g., UE identifiers) to generate coded rows (e.g., or a different dimension) of an intermediate WUS message. The network node may then apply the LDC to the intermediate WUS message to generate coded columns (e.g., or another dimension that is different than a dimension having the MDS coding applied) of the WUS message.

In some aspects, a size (e.g., a number of values) of the proper subset of values in the second dimension (e.g., a number of rows of values) may be based at least in part on a signal strength associated with one or more UEs in a group associated with the proper subset of values, and/or capabilities of the one or more UEs in the group to decode the number of values in the second dimension, among other examples. In some aspects, a size of the WUS message in the second dimension (e.g., a number of rows), after application of the second coding in the second dimension, may be associated with, and/or based at least in part on, an indication of a number of UEs indicated to wake up within the WUS message. Additionally, or alternatively, the size of the WUS message in the second dimension may be associated with or based at least in part on a number of UE groups into which sleeping UEs are assigned or a dynamic assignment by the UE or network node, among other examples.

In some aspects, the first coding is associated with a first set of parameters, and the second coding is associated with a second set of parameters. In some aspects, the first set of parameters and/or the second set of parameters are based at least in part on a signal strength (e.g., SNR) of communications at the one or more UEs. For example, a group of UEs (e.g., grouped for receiving a same portion of the WUS message) may be grouped based at least in part on having similar signal strengths and/or the group may be assigned a combination of the first set of parameters and/or the second set of parameters that is based at least in part on one or more signal strengths of the group (e.g., a strongest signal strength, a weakest signal strength, a median signal strength, or an average signal strength, among other examples).

As shown by reference number 635, the UE may receive, and the network node may transmit, the WUS message. In some aspects, the network node may broadcast the WUS message. In some aspects, the WUS message may be cell-specific, beam specific, and/or bandwidth part (BWP)-specific. In this way, the network node may transmit the WUS message to multiple UEs in a common message. As described herein, the WUS message may be encoded with product coding, with a coding stage of the product coding including LDC.

As shown by reference number 640, the UE may decode the WUS message in the second dimension. For example, the UE may use an LDC decoder to decode only a portion of the WUS message. In some aspects, the portion of the WUS message may include a proper subset of values of the WUS message in the first dimension (e.g., a proper subset of rows of the WUS message).

In some aspects, decoding the WUS includes decoding the WUS message in the second dimension. For example, the UE may use an LDC decoder to decode the WUS message in the second dimension. The UE may decode the WUS message in the second dimension to generate partially decoded values of the WUS message in the first dimension (e.g., rows of the WUS message that have been decoded in a column dimension). For example, the UE may decode only a portion of the WUS dimension based at least in part on the portion (e.g., a proper subset of first dimension values) being mapped to a group to which the UE is assigned.

In some aspects, the UE may be assigned to the group based at least in part on receiving an indication of the portion from the network node and/or based at least in part on an identifier of the UE (e.g., based at least in part on one or more digits of the identifier). In some aspects, the indication of the portion (e.g., an indication of the proper subset of values) may include an indication of a range of values in the second dimension and/or an RRC or MAC CE indication of the portion.

As shown by reference number 645, the UE may correlate the WUS message in the first dimension with an identifier of the UE. In some aspects, the identifier of the UE may include a coded identifier of the UE (e.g., indicated by the network node and/or derived based at least in part on an indication from the network node). The identifier may be based at least in part on an indication from the network node (e.g., an indication that the UE is identified by the network by the identifier), or may be derived from LSBs of RNTI, among other examples. In some aspects, the UE may receive the indication of the identifier via RRC signaling or a MAC CE.

In some aspects, the UE may compare a correlation of the identifier of the UE and the WUS message in the first dimension with a correlation threshold. Based at least in part on satisfying the correlation threshold, the UE may determine whether the WUS message indicates for the UE to wake up.

As shown by reference number 650, the UE may wake up based at least in part on the WUS message. For example, based at least in part on a correlation of the WUS message in the first dimension with the identifier of the UE, the UE may determine that the WUS indicated that that the UE is to wake up.

In some aspects, the UE may transmit a reply to the WUS message to indicate that the UE is awake. For example, based at least in part on determining that the WUS message indicates that the UE is to wake up, the UE may wake up and transmit an acknowledgment associated with the WUS or another indication that the UE is awake and ready to communicate with the network node. In some aspects, the network node may retransmit the WUS message based at least in part on failing to receive the reply to the WUS message. In some aspects, the network node may retransmit the WUS message with different transmission parameters, such as an increased transmission power.

As shown by reference number 655, the UE may receive, and the network node may transmit, a communication based at least in part on the WUS message. For example, the UE may receive a control channel communication based at least in part on the WUS message indicating to wake up. Based at least in part on receiving the control channel communication, the UE may receive a subsequent data channel communication (e.g., scheduled by the control channel communication).

Based at least in part on encoding the WUS using a product code, the WUS may conserve computing, power, communication, and network resources while supporting a power saving mode (e.g., DRX mode). Additionally, or alternatively, based at least in part on UEs being grouped and being configured to decode only a proper subset of rows of the WUS, the UEs may conserve power and computing resources.

As indicated above, FIG. 6 is provided as an example. Other examples may differ from what is described with respect to FIG. 6.

Figure 7:
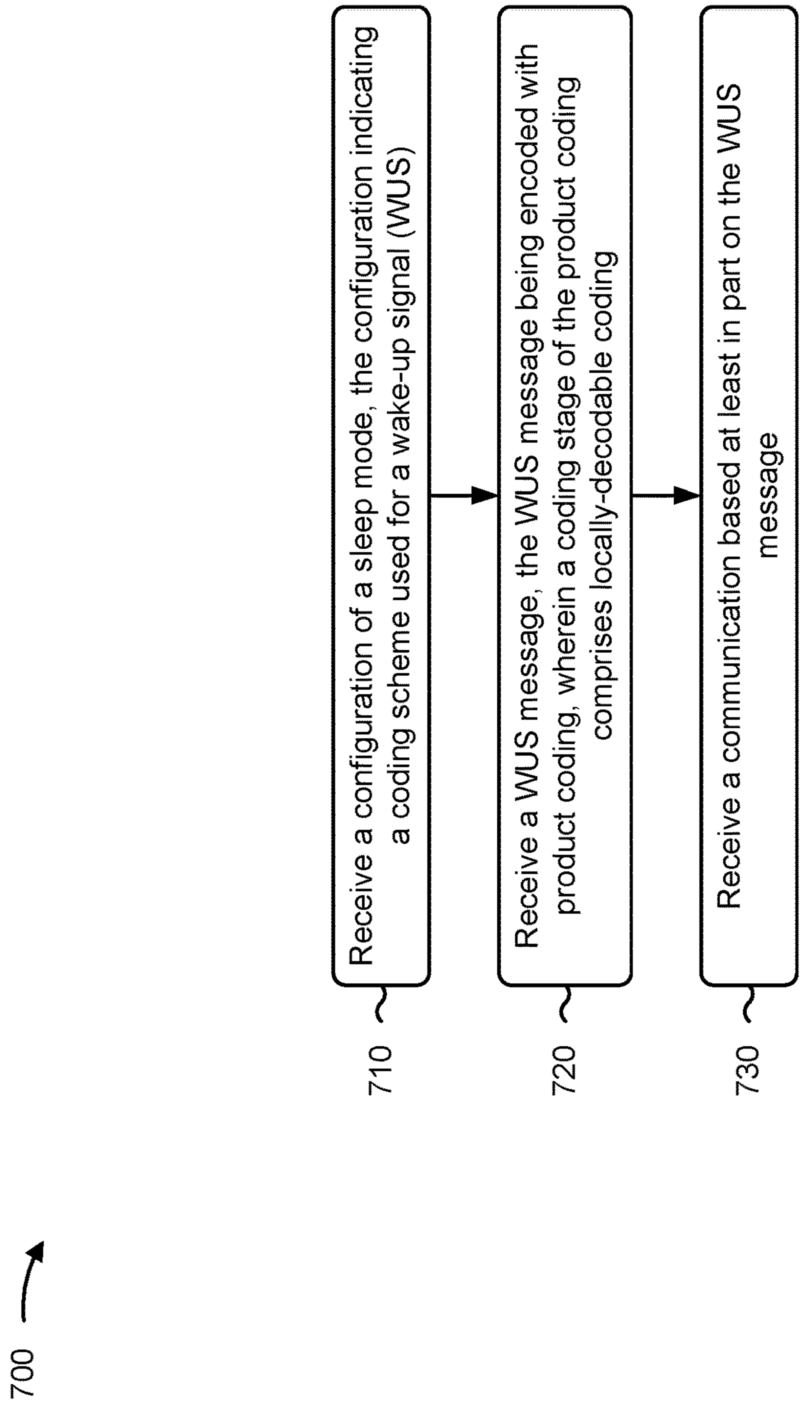
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with a WUS coding scheme.

As shown in FIG. 7, in some aspects, process 700 may include receiving a configuration of a sleep mode, the configuration indicating a coding scheme used for a WUS (block 710). For example, the UE (e.g., using communication manager 140 and/or reception component 902, depicted in FIG. 9) may receive a configuration of a sleep mode, the configuration indicating a coding scheme used for a WUS, as described above.

As further shown in FIG. 7, in some aspects, process 700 may include receiving a WUS message, the WUS message being encoded with product coding, wherein a coding stage of the product coding comprises locally-decodable coding (block 720). For example, the UE (e.g., using communication manager 140 and/or reception component 902, depicted in FIG. 9) may receive a WUS message, the WUS message being encoded with product coding, wherein a coding stage of the product coding comprises locally-decodable coding, as described above.

As further shown in FIG. 7, in some aspects, process 700 may include receiving a communication based at least in part on the WUS message (block 730). For example, the UE (e.g., using communication manager 140 and/or reception component 902, depicted in FIG. 900) may receive a communication based at least in part on the WUS message, as described above.

Process 700 may include additional aspects, such as any single aspect or any combination of aspects described below and/or in connection with one or more other processes described elsewhere herein.

In a first aspect, receiving the communication comprises receiving a control channel communication.

In a second aspect, alone or in combination with the first aspect, receiving the communication is based at least in part on the WUS message indicating to wake up.

In a third aspect, alone or in combination with one or more of the first and second aspects, the product coding comprises a first coding that includes maximum distance separable coding, and a second coding that includes the locally-decodable coding.

In a fourth aspect, alone or in combination with one or more of the first through third aspects, the product coding comprises application of a first coding in a first dimension, and application of a second coding in a second dimension.

In a fifth aspect, alone or in combination with one or more of the first through fourth aspects, a size of the WUS message in the second dimension, after application of the second coding in the second dimension, is associated with one or more of an indication of a number of UEs indicated to wake up, a number of UE groups into which sleeping UEs are assigned, or a dynamic assignment by the UE.

In a sixth aspect, alone or in combination with one or more of the first through fifth aspects, the first coding is associated with a first set of parameters, wherein the second coding is associated with a second set of parameters, and wherein one or more of the first set of parameters or the second set of parameters are based at least in part on a signal strength of communications at the UE.

In a seventh aspect, alone or in combination with one or more of the first through sixth aspects, process 700 includes decoding the WUS, wherein decoding the WUS comprises one or more of decoding the WUS message in the second dimension, correlating the WUS message, in the first dimension, with an identifier of the UE, or comparing a correlation of the identifier of the UE and the WUS message in the first dimension with a correlation threshold.

In an eighth aspect, alone or in combination with one or more of the first through seventh aspects, the identifier of the UE is based at least in part on an indication from a network node, or LSBs of RNTI.

In a ninth aspect, alone or in combination with one or more of the first through eighth aspects, decoding the WUS message in the second dimension comprises decoding a proper subset of values in the second dimension.

In a tenth aspect, alone or in combination with one or more of the first through ninth aspects, a number of values in the proper subset of values in the second dimension is based at least in part on one or more of a signal strength associated with the UE, or a capability of the UE to decode the number of values in the second dimension.

In an eleventh aspect, alone or in combination with one or more of the first through tenth aspects, decoding the proper subset of values in the second dimension is based at least in part on one or more of reception of an indication of the proper subset of values, or the identifier of the UE.

In a twelfth aspect, alone or in combination with one or more of the first through eleventh aspects, reception of the indication of the proper subset of values comprises receiving an indication of a range of values in the second dimension, or receiving a RRC indication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
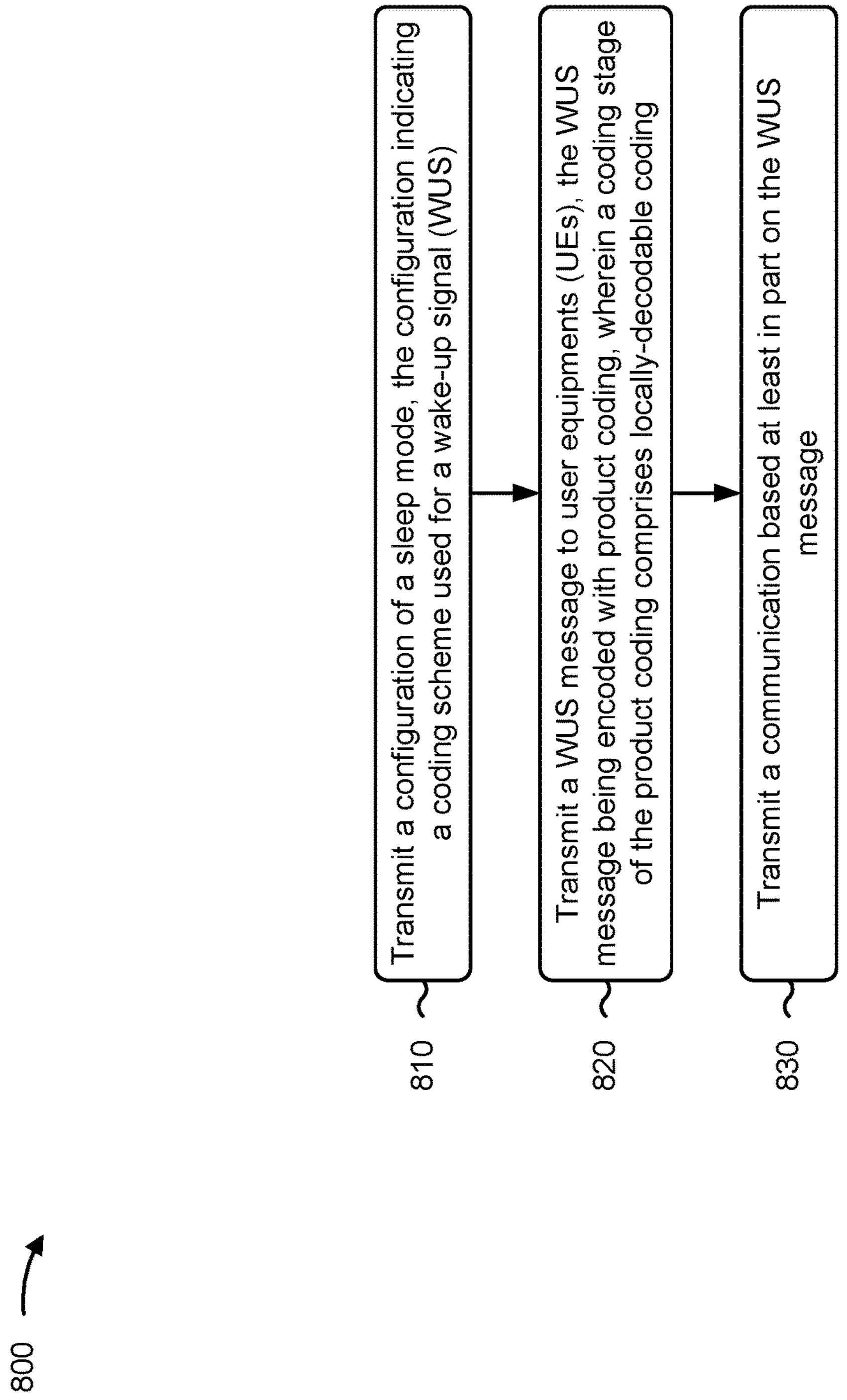
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with a WUS coding scheme.

As shown in FIG. 8, in some aspects, process 800 may include transmitting a configuration of a sleep mode, the configuration indicating a coding scheme used for a WUS (block 810). For example, the network node (e.g., using communication manager 150 and/or transmission component 104, depicted in FIG. 10) may transmit a configuration of a sleep mode, the configuration indicating a coding scheme used for a WUS, as described above.

As further shown in FIG. 8, in some aspects, process 800 may include transmitting a WUS message to UEs, the WUS message being encoded with product coding, wherein a coding stage of the product coding comprises locally-decodable coding (block 820). For example, the network node (e.g., using communication manager 1008 and/or transmission component 1004, depicted in FIG. 10) may transmit a WUS message to UEs, the WUS message being encoded with product coding, wherein a coding stage of the product coding comprises locally-decodable coding, as described above.

As further shown in FIG. 8, in some aspects, process 800 may include transmitting a communication based at least in part on the WUS message (block 830). For example, the network node (e.g., using communication manager 1008 and/or transmission component 1004, depicted in FIG. 10) may transmit a communication based at least in part on the WUS message, as described above.

Process 800 may include additional aspects, such as any single aspect or any combination of aspects described below and/or in connection with one or more other processes described elsewhere herein.

In a first aspect, transmitting the communication comprises transmitting a control channel communication.

In a second aspect, alone or in combination with the first aspect, transmitting the communication is based at least in part on the WUS message indicating to wake up.

In a third aspect, alone or in combination with one or more of the first and second aspects, the product coding comprises a first coding that includes maximum distance separable coding, and a second coding that includes the locally-decodable coding.

In a fourth aspect, alone or in combination with one or more of the first through third aspects, the product coding comprises application of a first coding in a first dimension, and application of a second coding in a second dimension.

In a fifth aspect, alone or in combination with one or more of the first through fourth aspects, a size of the WUS message in the second dimension, after application of the second coding in the second dimension, is associated with one or more of an indication of a number of the UEs indicated to wake up, a number of UE groups into which the UEs are assigned, or a dynamic assignment by a UE of the UEs.

In a sixth aspect, alone or in combination with one or more of the first through fifth aspects, the first coding is associated with a first set of parameters, wherein the second coding is associated with a second set of parameters, and wherein one or more of the first set of parameters or the second set of parameters are based at least in part on expected received signal strengths of communications at the UEs.

In a seventh aspect, alone or in combination with one or more of the first through sixth aspects, process 800 includes encoding the WUS, wherein encoding the WUS comprises one or more of encoding the WUS message in the first dimension, and encoding the WUS message in the second dimension.

In an eighth aspect, alone or in combination with one or more of the first through seventh aspects, the WUS message includes portions of the WUS message allocated to different groups of the UEs.

In a ninth aspect, alone or in combination with one or more of the first through eighth aspects, a number of values in a portion of the WUS is based at least in part on one or more of a signal strength associated with a subset of the UEs within an associated group of the UEs, or a capability of the subset of the UEs to decode the number of values in the second dimension.

In a tenth aspect, alone or in combination with one or more of the first through ninth aspects, assignments of the UEs to the different groups is based at least in part on one or more of transmission of an indication of the portions of the WUS to the UEs, or identifiers of the UEs.

In an eleventh aspect, alone or in combination with one or more of the first through tenth aspects, the identifiers of the UEs are based at least in part on an indication from a network node, or LSBs of RNTI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
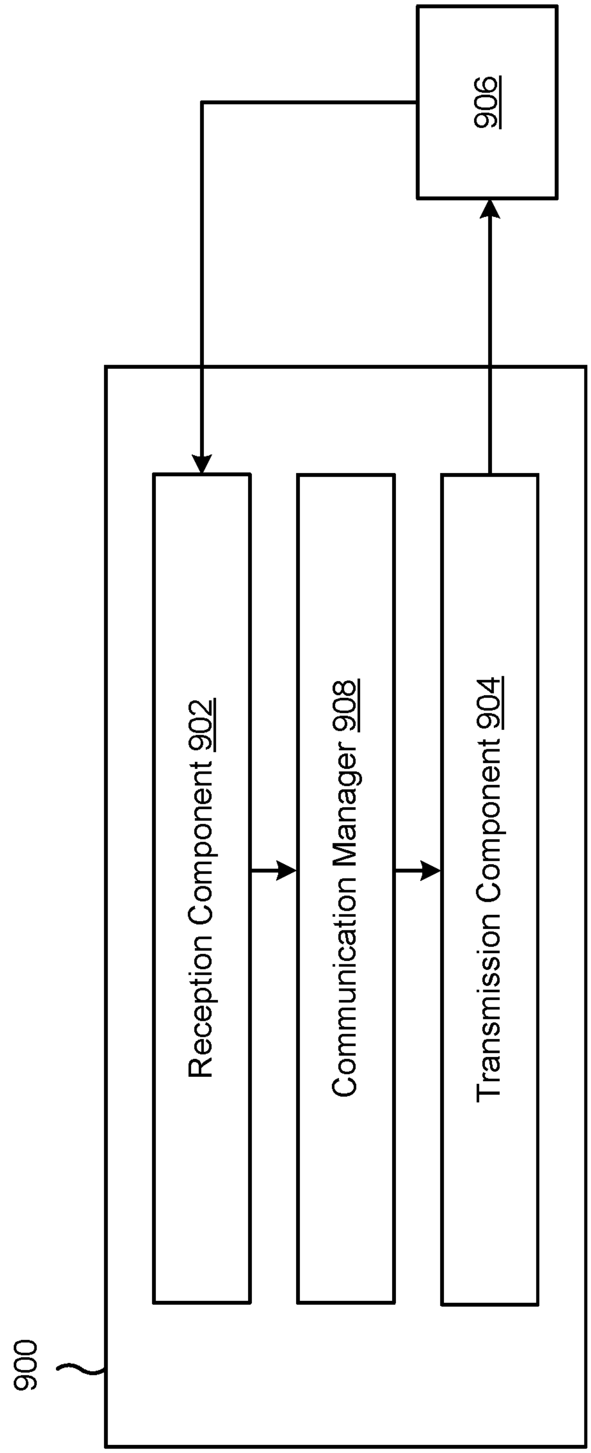
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., the communication manager 140).

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a configuration of a sleep mode, the configuration indicating a coding scheme used for a WUS. The reception component 902 may receive a WUS message, the WUS message being encoded with product coding, wherein a coding stage of the product coding comprises locally-decodable coding. The reception component 902 may receive a communication based at least in part on the WUS message.

The reception component 902 and/or the communication manager 908 may decode the WUS, wherein decoding the WUS comprises one or more of decoding the WUS message in the second dimension; correlating the WUS message, in the first dimension, with an identifier of the UE; or comparing a correlation of the identifier of the UE and the WUS message in the first dimension with a correlation threshold.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
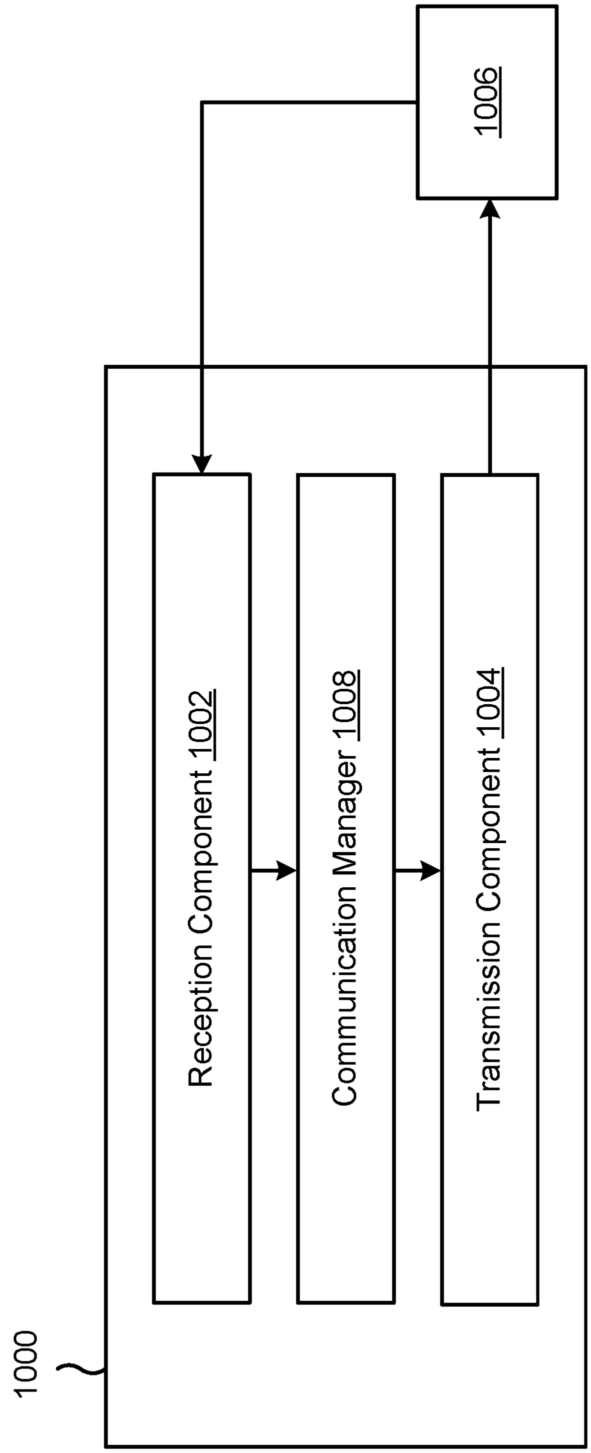
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150).

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit a configuration of a sleep mode, the configuration indicating a coding scheme used for a WUS. The transmission component 1004 may transmit a WUS message to UEs, the WUS message being encoded with product coding, wherein a coding stage of the product coding comprises locally-decodable coding. The transmission component 1004 may transmit a communication based at least in part on the WUS message.

The transmission component 1004 and/or communication manager 1008 may encode the WUS, wherein encoding the WUS comprises one or more of encoding the WUS message in the first dimension; and encoding the WUS message in the second dimension.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a configuration of a sleep mode, the configuration indicating a coding scheme used for a wake-up signal (WUS); receiving a WUS message, the WUS message being encoded with product coding, wherein a coding stage of the product coding comprises locally-decodable coding; and receiving a communication based at least in part on the WUS message.

Aspect 2: The method of Aspect 1, wherein receiving the communication comprises: receiving a control channel communication.

Aspect 3: The method of any of Aspects 1-2, wherein receiving the communication is based at least in part on the WUS message indicating to wake up.

Aspect 4: The method of any of Aspects 1-3, wherein the product coding comprises: a first coding that includes maximum distance separable coding, and a second coding that includes the locally-decodable coding.

Aspect 5: The method of any of Aspects 1-4, wherein the product coding comprises: application of a first coding in a first dimension, and application of a second coding in a second dimension.

Aspect 6: The method of Aspect 5, wherein a size of the WUS message in the second dimension, after application of the second coding in the second dimension, is associated with one or more of: an indication of a number of UEs indicated to wake up, a number of UE groups into which sleeping UEs are assigned, or a dynamic assignment by the UE.

Aspect 7: The method of any of Aspects 5-6, wherein the first coding is associated with a first set of parameters, wherein the second coding is associated with a second set of parameters, and wherein one or more of the first set of parameters or the second set of parameters are based at least in part on a signal strength of communications at the UE.

Aspect 8: The method of any of Aspects 5-7, further comprising decoding the WUS, wherein decoding the WUS comprises one or more of: decoding the WUS message in the second dimension; correlating the WUS message, in the first dimension, with an identifier of the UE; or comparing a correlation of the identifier of the UE and the WUS message in the first dimension with a correlation threshold.

Aspect 9: The method of Aspect 8, wherein the identifier of the UE is based at least in part on: an indication from a network node, or least significant bits (LSBs) of radio network temporary identifier (RNTI).

Aspect 10: The method of any of Aspects 8-9, wherein decoding the WUS message in the second dimension comprises: decoding a proper subset of values in the second dimension.

Aspect 11: The method of Aspect 10, wherein a number of values in the proper subset of values in the second dimension is based at least in part on one or more of: a signal strength associated with the UE, or a capability of the UE to decode the number of values in the second dimension.

Aspect 12: The method of any of Aspects 10-11, wherein decoding the proper subset of values in the second dimension is based at least in part on one or more of: reception of an indication of the proper subset of values, or the identifier of the UE.

Aspect 13: The method of Aspect 12, wherein reception of the indication of the proper subset of values comprises: receiving an indication of a range of values in the second dimension, or receiving a radio resource control (RRC) indication.

Aspect 14: A method of wireless communication performed by a network node, comprising: transmitting a configuration of a sleep mode, the configuration indicating a coding scheme used for a wake-up signal (WUS); transmitting a WUS message to user equipments (UEs), the WUS message being encoded with product coding, wherein a coding stage of the product coding comprises locally-decodable coding; and transmitting a communication based at least in part on the WUS message.

Aspect 15: The method of Aspect 14, wherein transmitting the communication comprises: transmitting a control channel communication.

Aspect 16: The method of any of Aspects 14-15, wherein transmitting the communication is based at least in part on the WUS message indicating to wake up.

Aspect 17: The method of any of Aspects 14-16, wherein the product coding comprises: a first coding that includes maximum distance separable coding, and a second coding that includes the locally-decodable coding.

Aspect 18: The method of any of Aspects 14-17, wherein the product coding comprises: application of a first coding in a first dimension, and application of a second coding in a second dimension.

Aspect 19: The method of Aspect 18, wherein a size of the WUS message in the second dimension, after application of the second coding in the second dimension, is associated with one or more of: an indication of a number of the UEs indicated to wake up, a number of UE groups into which the UEs are assigned, or a dynamic assignment by a UE of the UEs.

Aspect 20: The method of any of Aspects 18-19, wherein the first coding is associated with a first set of parameters, wherein the second coding is associated with a second set of parameters, and wherein one or more of the first set of parameters or the second set of parameters are based at least in part on expected received signal strengths of communications at the UEs.

Aspect 21: The method of any of Aspects 18-20, further comprising encoding the WUS, wherein encoding the WUS comprises one or more of: encoding the WUS message in the first dimension; and encoding the WUS message in the second dimension.

Aspect 22: The method of any of Aspects 14-21, wherein the WUS message includes portions of the WUS message allocated to different groups of the UEs.

Aspect 23: The method of Aspect 22, wherein a number of values in a portion of the WUS is based at least in part on one or more of: a signal strength associated with a subset of the UEs within an associated group of the UEs, or a capability of the subset of the UEs to decode the number of values in a dimension associated with the portion.

Aspect 24: The method of any of Aspects 22-23, wherein assignments of the UEs to the different groups is based at least in part on one or more of: transmission of an indication of the portions of the WUS to the UEs, or identifiers of the UEs.

Aspect 25: The method of Aspect 24, wherein the identifiers of the UEs are based at least in part on: an indication from a network node, or least significant bits (LSBs) of radio network temporary identifier (RNTI).

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

receive a configuration of a sleep mode, the configuration indicating a coding scheme used for a wake-up signal (WUS), wherein the configuration indicates a group to which the UE is assigned;

receive a mapping of the group to a proper subset of rows of a WUS message that the UE is to decode to monitor for a wake-up indication, wherein a number of rows of the proper subset of rows is based at least in part on a number of rows of the WUS message that the UE is capable of decoding within a threshold amount of time;

receive the WUS message, the WUS message being encoded with product coding, wherein a coding stage of the product coding comprises locally-decodable coding of the proper subset of rows, and wherein the product coding comprises application of a first coding that includes maximum distance separable coding in a first dimension to encode one or more UE identifiers and the product coding comprises application of a second coding in a second dimension; and receive a communication based at least in part on the WUS message.

2. The UE of claim 1, wherein the one or more processors, to receive the communication, are configured to:

receive a control channel communication.

3. The UE of claim 1, wherein receiving the communication is based at least in part on the WUS message indicating to wake up.

4. The UE of claim 1, wherein the product coding comprises:

the second coding that includes the locally-decodable coding.

5. The UE of claim 1, wherein a size of the WUS message in the second dimension, after application of the second coding in the second dimension, is associated with one or more of:

an indication of a number of UEs indicated to wake up, a number of UE groups into which sleeping UEs are assigned, or a dynamic assignment by a network node.

6. The UE of claim 1, wherein the first coding is associated with a first set of parameters, wherein the second coding is associated with a second set of parameters, and wherein one or more of the first set of parameters or the second set of parameters are based at least in part on a signal strength of communications at the UE.

7. The UE of claim 1, wherein the one or more processors are further configured to decode the WUS, wherein decoding the WUS comprises one or more of:

decode the WUS message in the second dimension;

correlate the WUS message, in the first dimension, with an identifier of the UE; or compare a correlation of the identifier of the UE and the WUS message in the first dimension with a correlation threshold.

8. The UE of claim 7, wherein the identifier of the UE is based at least in part on:

an indication from a network node, or least significant bits (LSBs) of radio network temporary identifier (RNTI).

9. The UE of claim 7, wherein the one or more processors, to decode the WUS message in the second dimension, are configured to:

decode a proper subset of values in the second dimension.

10. The UE of claim 9, wherein a number of values in the proper subset of values in the second dimension is based at least in part on one or more of:

a signal strength associated with the UE, or a capability of the UE to decode the number of values in the second dimension.

11. The UE of claim 9, wherein decoding the proper subset of values in the second dimension is based at least in part on one or more of:

reception of an indication of the proper subset of values, or the identifier of the UE.

12. The UE of claim 11, wherein reception of the indication of the proper subset of values comprises:

receive an indication of a range of values in the second dimension, or receive a radio resource control (RRC) indication.

13. A network node for wireless communication, comprising:

one or more memories; and one or more processors, coupled to the one or more memories, configured to:

transmit a configuration of a sleep mode, the configuration indicating a coding scheme used for a wake-up signal (WUS), wherein the configuration indicates a group to which user equipments (UEs) are assigned;

transmit a mapping of the group to a proper subset of rows of a WUS message that a UE of the UEs is to decode to monitor for a wake-up indication, wherein a number of rows of the proper subset of rows is based at least in part on a number of rows of the WUS message that the UEs are capable of decoding within a threshold amount of time;

transmit the WUS message to the UEs, the WUS message being encoded with product coding, wherein a coding stage of the product coding comprises locally-decodable coding of the proper subset of rows, and wherein the product coding comprises application of a first coding that includes maximum distance separable coding in a first dimension to encode one or more UE identifiers and the product coding comprises application of a second coding in a second dimension; and transmit a communication based at least in part on the WUS message.

14. The network node of claim 13, wherein the one or more processors, to transmit the communication, are configured to:

transmit a control channel communication.

15. The network node of claim 13, wherein transmitting the communication is based at least in part on the WUS message indicating to wake up.

16. The network node of claim 13, wherein the product coding comprises:

the second coding that includes the locally-decodable coding.

17. The network node of claim 13, wherein a size of the WUS message in the second dimension, after application of the second coding in the second dimension, is associated with one or more of:

an indication of a number of the UEs indicated to wake up, a number of UE groups into which the UEs are assigned, or a dynamic assignment by a UE of the UEs.

18. The network node of claim 13, wherein the first coding is associated with a first set of parameters, wherein the second coding is associated with a second set of parameters, and wherein one or more of the first set of parameters or the second set of parameters are based at least in part on expected received signal strengths of communications at the UEs.

19. The network node of claim 13, wherein the one or more processors are further configured to encode the WUS, wherein encoding the WUS comprises one or more of:

encode the WUS message in the first dimension; and encode the WUS message in the second dimension.

20. The network node of claim 13, wherein the WUS message includes portions of the WUS message allocated to different groups of the UEs.

21. The network node of claim 20, wherein a number of values in a portion of the WUS is based at least in part on one or more of:

a signal strength associated with a subset of the UEs within an associated group of the UEs, or a capability of the subset of the UEs to decode the number of values in a dimension associated with the portion.

22. The network node of claim 20, wherein assignments of the UEs to the different groups is based at least in part on one or more of:

transmission of an indication of the portions of the WUS to the UEs, or identifiers of the UEs.

23. The network node of claim 22, wherein the identifiers of the UEs are based at least in part on:

an indication from a network node, or least significant bits (LSBs) of radio network temporary identifier (RNTI).

24. A method of wireless communication performed by a user equipment (UE), comprising:

receiving a configuration of a sleep mode, the configuration indicating a coding scheme used for a wake-up signal (WUS) wherein the configuration indicates a group to which the UE is assigned;

receiving a mapping of the group to a proper subset of rows of a WUS message that the UE is to decode to monitor for a wake-up indication, wherein a number of rows of the proper subset of rows is based at least in part on a number of rows of the WUS message that the UE is capable of decoding within a threshold amount of time;

receiving the WUS message, the WUS message being encoded with product coding, wherein a coding stage of the product coding comprises locally-decodable coding of the proper subset of rows, and wherein the product coding comprises application of a first coding that includes maximum distance separable coding in a first dimension to encode one or more UE identifiers and the product coding comprises application of a second coding in a second dimension; and receiving a communication based at least in part on the WUS message.

25. The method of claim 24, wherein the product coding comprises:

the second coding that includes the locally-decodable coding.

26. A method of wireless communication performed by a network node, comprising:

transmitting a configuration of a sleep mode, the configuration indicating a coding scheme used for a wake-up signal (WUS), wherein the configuration indicates a group to which user equipments (UEs) are assigned;

transmitting a mapping of the group to a proper subset of rows of a WUS message that the a UE of the UEs is to decode to monitor for a wake-up indication, wherein a number of rows of the proper subset of rows is based at least in part on a number of rows of the WUS message that the UEs are capable of decoding within a threshold amount of time;

transmitting the WUS message to the UEs, the WUS message being encoded with product coding, wherein a coding stage of the product coding comprises locally-decodable coding of the proper subset of rows, and wherein the product coding comprises application of a first coding that includes maximum distance separable coding in a first dimension to encode one or more UE identifiers and the product coding comprises application of a second coding in a second dimension; and transmitting a communication based at least in part on the WUS message.

27. The method of claim 24, wherein receiving the communication comprises: receiving a control channel communication.

28. The method of claim 24, wherein a size of the WUS message in the second dimension, after application of the second coding in the second dimension, is associated with one or more of:

an indication of a number of UEs indicated to wake up, a number of UE groups into which sleeping UEs are assigned, or a dynamic assignment by a network node.

29. The method of claim 26, wherein transmitting the configuration comprises: transmitting a control channel communication.

30. The method of claim 26, wherein transmitting the communication is based at least in part on the WUS message indicating to wake up.

* * * * *